(12) United States Patent
Kaneko et al.

(10) Patent No.: US 7,719,229 B2
(45) Date of Patent: May 18, 2010

(54) CHARGING SYSTEM FOR LEGGED MOBILE ROBOT

(75) Inventors: Satoshi Kaneko, Wako (JP); Koji Okazaki, Wako (JP); Hiroyuki Makino, Wako (JP); Takashi Nakayama, Wako (JP); Masaaki Muromachi, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 523 days.

(21) Appl. No.: 11/705,772

(22) Filed: Feb. 14, 2007

(65) Prior Publication Data

US 2007/0216347 A1 Sep. 20, 2007

(30) Foreign Application Priority Data

Feb. 14, 2006 (JP) ............................. 2006-037151
Feb. 14, 2007 (JP) ............................. 2007-033344

(51) Int. Cl.
*H01J 7/00* (2006.01)
*A63H 30/00* (2006.01)

(52) U.S. Cl. .................... 320/113; 320/109; 320/114; 901/1; 901/5; 446/175

(58) Field of Classification Search ................. 320/113, 320/109
See application file for complete search history.

(56) References Cited

U.S. PATENT DOCUMENTS 6,764,373 B1 * 7/2004 Osawa et al. ................. 446/175

FOREIGN PATENT DOCUMENTS

JP 2001-179663 7/2001
JP 2004-298984 * 10/2004

* cited by examiner

*Primary Examiner*—Edward Tso
*Assistant Examiner*—Yalkew Fantu
(74) *Attorney, Agent, or Firm*—Squire, Sanders & Dempsey L.L.P.

(57) ABSTRACT

A charging system for a legged mobile robot that facilitates positioning of a robot to be charged and does not put a load on the robot is provided. The charging system includes a battery 2, a power receiving connector 4 and a movable shutter member 5 capable of being opened and closed on a rear cover 3, which are provided on a robot 1, and a holder 21, a power supplying connector 22, a slide mechanism 23, a base plate 25, a charging power supply 26 and the like, which are provided on a charging station 20. The robot 1 performs a predetermined positioning on the base plate 25 and then moves the center of gravity rearward to connect the power receiving connector 4 to the power supplying connector 22. In this step, when the rear cover 3 of the robot 1 is guided by a first guide section 21a of the holder 21, the slide mechanism 23 allows the holder 21 to move horizontally. Thus, even if the robot 1 and the charging station 20 are slightly misaligned with each other, the robot 1 can be easily positioned correctly.

11 Claims, 11 Drawing Sheets

CHARGING SYSTEM FOR LEGGED MOBILE ROBOT

BACKGROUND OF THE INVENTION

1. Field of the Invention

The present invention relates to a system for charging a battery of a legged mobile robot.

2. Description of the Related Art

For example, Japanese Patent Laid-Open No. 2001-179663 discloses a system for charging a battery of a legged mobile robot configured as described below. A power receiving connector used for charging an internal battery is provided near the hip part of the robot, and a power receiving terminal is exposed on the surface of the power receiving connector. On the other hand, a charging station for charging the robot has a power supplying connector, and a power supplying terminals is exposed on the surface of the power supplying connector. The robot moves closer to the charging station and connects the power receiving connector to the power supplying connector. As a result, the power receiving terminal and the power supplying terminal are connected to each other, and the robot is charged.

In the system disclosed in Japanese Patent Laid-Open No. 2001-179663, in order to facilitate alignment between the robot and the charging station, the power receiving connector has a trapezoidal profile narrower at the end close to the power supplying connector, and the power supplying connector has a recess shaped to confirm to the profile of the power receiving connector. Therefore, even if the robot to be charged is slightly misaligned, the trapezoidal power receiving connector is guided by the recess in the power supplying connector and connected to the power supplying connector, and thus, the positioning of the robot to be charged is facilitated (see the paragraphs 0139 and 0145 and FIGS. 7 to 9).

When alignment of the system configured as described above is performed, since the charging station is fixed to the floor or the like, the connector on the robot has to be moved to achieve alignment between the connectors. In the case of the legged mobile robot disclosed in Japanese Patent Laid-Open No. 2001-179663, since the power receiving connector is attached to the hip part, the joints of knees, ankles or the like have to be moved, or the legs have to be displaced, in order to move the power receiving connector.

However, in the case of the legged mobile robot, if the hip part is moved horizontally by moving the joints of knees, ankles or the like without displacing the legs, the center of gravity of the robot is displaced, and therefore, the robot has to be charged with the joints being subjected to a moment. If the robot is charged with the joints being subjected to a moment as described above, additional power is required to maintain the posture of the robot, and there is a possibility that the power consumption during charging increases. If the power receiving connector is displaced by displacing the legs, the legs of the robot are displaced with the power receiving connector and the power supplying connector being partially in contact with each other, so that the connectors are overloaded, and the connectors can be damaged.

Furthermore, the power receiving terminal disclosed in Japanese Patent Laid-Open No. 2001-179663 is always exposed to the outside, and therefore, if the surface of the terminal is soiled with something, the electrical contact between the power receiving terminal and the power supplying terminal can be poor. Furthermore, in the case of the arrangement disclosed in Japanese Patent Laid-Open No. 2001-179663, if spark discharge (ark discharge) occurs when the power receiving terminal and the power supplying terminal are connected to each other for charging of the robot or disconnected from each other after charging of the robot, the spark discharge can cause deterioration of the terminals, the deterioration of the terminals can cause an increase of the resistance between the terminals, and the increase of the resistance can cause heat generation.

SUMMARY OF THE INVENTION

An object of the present invention is to improve a charging system for a legged mobile robot. More specifically, in order to eliminate the disadvantages described above, an object of the present invention is to provide a charging system that facilitates positioning of a robot to be charged and does not put a load on the robot. Another object of the present invention is to provide a charging system that prevents a power receiving terminal from being soiled or deteriorated and does not make any nearby person from feeling uncomfortable.

In order to attain the objects described above, a charging system for a legged mobile robot according to the present invention is a charging system that charges a battery of a legged mobile robot, comprising: a charging station on which the robot is charged, in which the robot includes a power receiving connector having a power receiving terminal, and the charging station includes a charging power supply that outputs a charging current to the battery, a power supplying connector designed to be connected to the power receiving connector, a power supplying terminal provided on the power supplying connector and designed to come into contact with the power receiving terminal, guide means that guides the robot to reduce the misalignment between the power receiving connector and the power supplying connector in a predetermined direction when the robot comes close to the charging station for charging, and moving means for moving the guide means in the predetermined direction by the force exerted on the guide means as the robot comes close to the charging station.

In the charging system according to the present invention, if the robot comes close to the charging station to be charged on the charging station, the guide means guides the robot to reduce the misalignment between the power receiving connector and the power supplying connector in the predetermined direction. When the robot is guided by the guide means, a force that moves the robot and the guide means relative to each other in the predetermined direction occurs between the robot and the guide means. When such a force occurs between the two, the moving means moves the guide means in the predetermined direction. Accordingly, there is no need to adjust the joints of knees, ankles or the like to compensate for the misalignment on the part of the robot, so that the robot can be charged in a natural, reasonable posture, and therefore, the robot can be easily controlled. As a result, unlike conventional systems, no power is consumed for maintaining the unreasonable posture of the robot, and thus, the robot can be quickly charged.

Furthermore, in the charging system for a legged mobile robot according to the present invention, it is preferred that the predetermined direction is a horizontal direction which is perpendicular to the direction in which the robot comes close to the charging station for charging. As for the vertical alignment, if the height of the power supplying connector on the charging station is not changed, the robot itself can adjust the height of the power receiving connector. Misalignment of the robot moving to the predetermined position on the charging station is likely to occur in the horizontal direction perpendicular to the direction in which the robot comes close to the charging station for charging. Therefore, by setting the direction of guiding by the guide means and the direction of movement by the moving means to be horizontal and perpendicular to the direction in which the robot comes close to the charging station for charging, the positioning of the robot in the direction in which misalignment is likely to occur is facilitated.

Furthermore, the moving means may have a slide rail that is provided on the charging station and extend horizontally and a slide block capable of horizontally moving along the slide rail, and the power supplying connector may be fixed to the slide block.

Furthermore, in the charging system for a legged mobile robot according to the present invention, it is preferred that the power supplying connector is fixed to the slide block via a rubber bush. With such a configuration, the power supplying connector can move not only horizontally but also vertically to some extent. Therefore, even if the power supplying connector and the power receiving connector are slightly vertically misaligned with each other when the robot is charged on the charging station, the rubber bush can accommodate the misalignment.

Furthermore, it is preferred that the charging system for a legged mobile robot according to the present invention further comprises a locking mechanism that locks the robot and the charging station to maintain the connection between the power receiving terminal and the power supplying terminal when the power receiving terminal and the power supplying terminal are connected to each other. With such a configuration, the locking mechanism maintains the connection between the power receiving terminal and the power supplying terminal even if an external force is exerted on the robot during charging for some reason, so that disconnection between the connectors during charging is prevented.

Furthermore, in the charging system for a legged mobile robot according to the present invention, it is preferred that the guide means includes a guide pin having a tapered tip and provided on one of the robot and the charging station and a guide sleeve having a widened opening and provided on the other of the robot and the charging station to which the guide pin is to be inserted, and the moving means is a floating member having resiliency that enables the guide pin or the guide sleeve to move in the predetermined direction.

With such a configruatin, even if the power supplying connector and the power receiving connector are slightly misaligned with each other, the tapered tip of the guide pin abuts against the inner surface of the widened opening of the guide sleeve, and the guide pin is inserted into the guide sleeve. In addition, since the moving means can move the guide pin or the guide sleeve in the predetermined direction, the power supplying connector can be guided by the guide means to a position where the power supplying connector can be connected to the power receiving connector.

Furthermore, in the charging system for a legged mobile robot according to the present invention, it is preferred that the guide means has a locking mechanism that prevents the guide pin from dropping from the guide sleeve when the guide pin is inserted into the guide sleeve, and the power receiving connector and the power supplying connector are connected to each other. In the case where the locking mechanism is provided for the guide pin and the guide sleeve in this way, the guide means and the locking mechanism may be integrated. Thus, the arrangement of the guide means and the locking mechanism can be downsized.

In the case where the locking mechanism is provided for the guide pin and the guide sleeve in this way, the guide means may have rotating means capable of rotating the guide pin, the guide sleeve may have a guide slit composed of a longitudinal slit extending in the axial direction toward the opening of the guide sleeve and an engaging slit extending in the circumferential direction of the guide sleeve from the root of the longitudinal slit, the guide pin may have an engaging protrusion that protrudes from the periphery thereof and is capable of being inserted into the guide slit, and when the power receiving connector and the power supplying connector are connected to each other, the engaging protrusion may be inserted into the longitudinal slit of the guide slit, and then inserted into the engaging slit of the guide slit by the action of the rotating means, and then held in that state.

Furthermore, in the charging system for a legged mobile robot according to the present invention, it is preferred that the power receiving connector is provided inside the robot and covered with a lid capable or being opened and closed, and the lid is closed when the power receiving connector and the power supplying connector are not connected to each other and opened when the power supplying connector comes close to the power receiving connector. With such a configuration, when the power receiving connector and the power supplying connector are not connected to each other, the power receiving connector is housed in the robot, covered with the lid and therefore shielded from the outside, so that there is no possibility that the power receiving terminal comes into contact with an outside obstacle or the like during movement of the robot. In addition, since the power receiving connector and the power receiving connector are housed in the robot except during charging, the power receiving terminal and the power receiving connector are not affected by the outside environment of the robot and are prevented from being soiled.

Furthermore, in the charging system for a legged mobile robot according to the present invention, it is preferred that the charging station includes connection detection means for detecting whether the power receiving terminal and the power supplying terminal are connected to each other, and charging control means for making the charging power supply supply a charging current to the battery to charge the battery via the power supplying terminal and the power receiving terminal when the connection detection means detects that the power receiving terminal and the power supplying terminal are connected to each other. With such a configuration, the charging current is supplied only after the power receiving terminal and the power supplying terminal are connected to each other, and therefore, there is no possibility that a spark discharge occurs between the power receiving terminal and the power supplying terminal when the connectors are connected to each other.

Furthermore, in the charging system for a legged mobile robot according to the present invention, it is preferred that, when stopping charging of the battery, the charging control means stops the supply of the charging current from the charging power supply to the battery before disconnecting the power receiving terminal and the power supplying terminal. With such a configuration, since the supply of the charging current is stopped before the connectors are disconnected, there is no possibility that a spark discharge occurs between the power receiving terminal and the power supplying terminal.

DETAILED DESCRIPTION OF THE PREFERRED EMBODIMENTS

Figure 1:
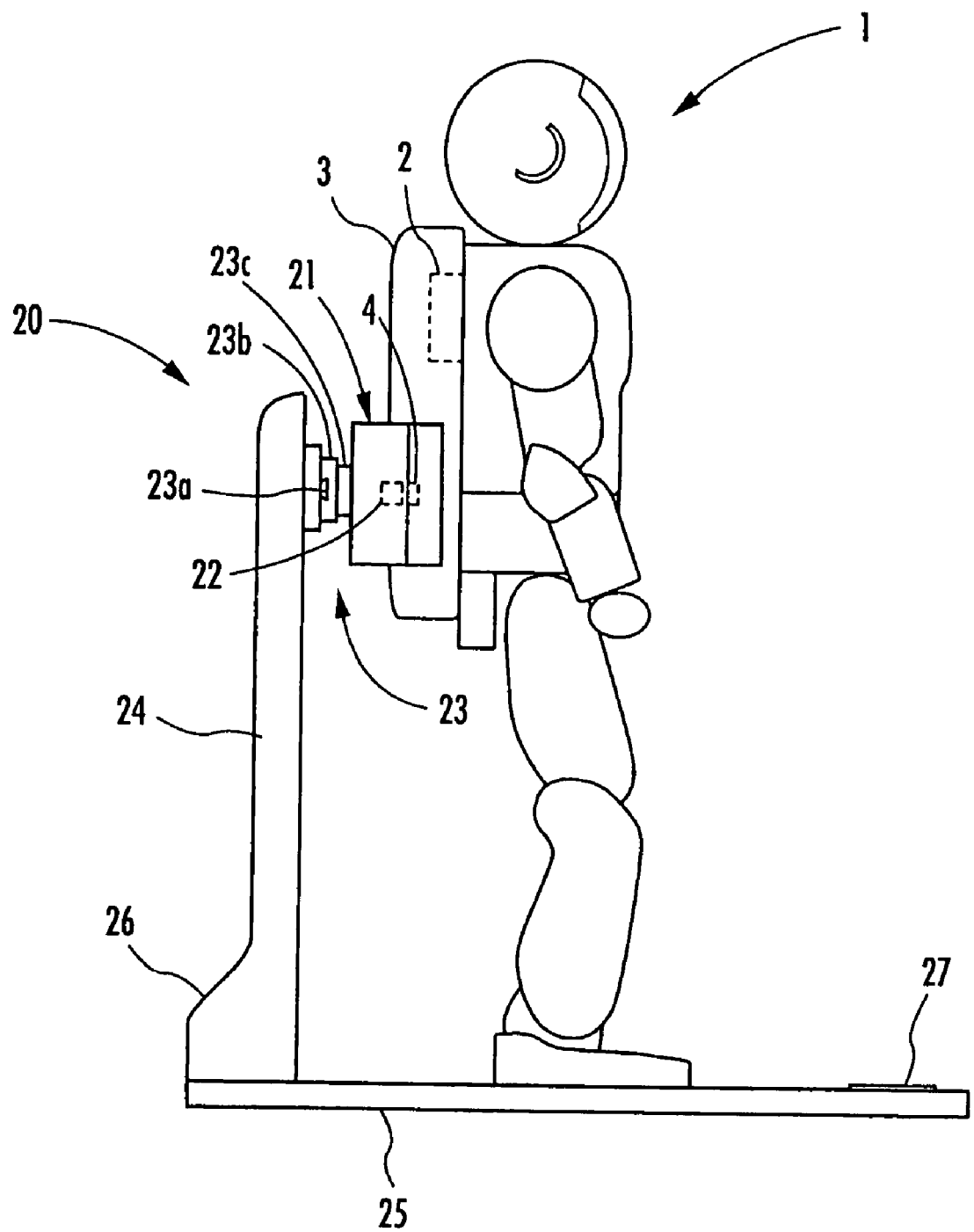
FIG. 1 is a diagram showing a robot that is being charged on a charging station of a charging system according to an embodiment of the present invention.
Figure 2:
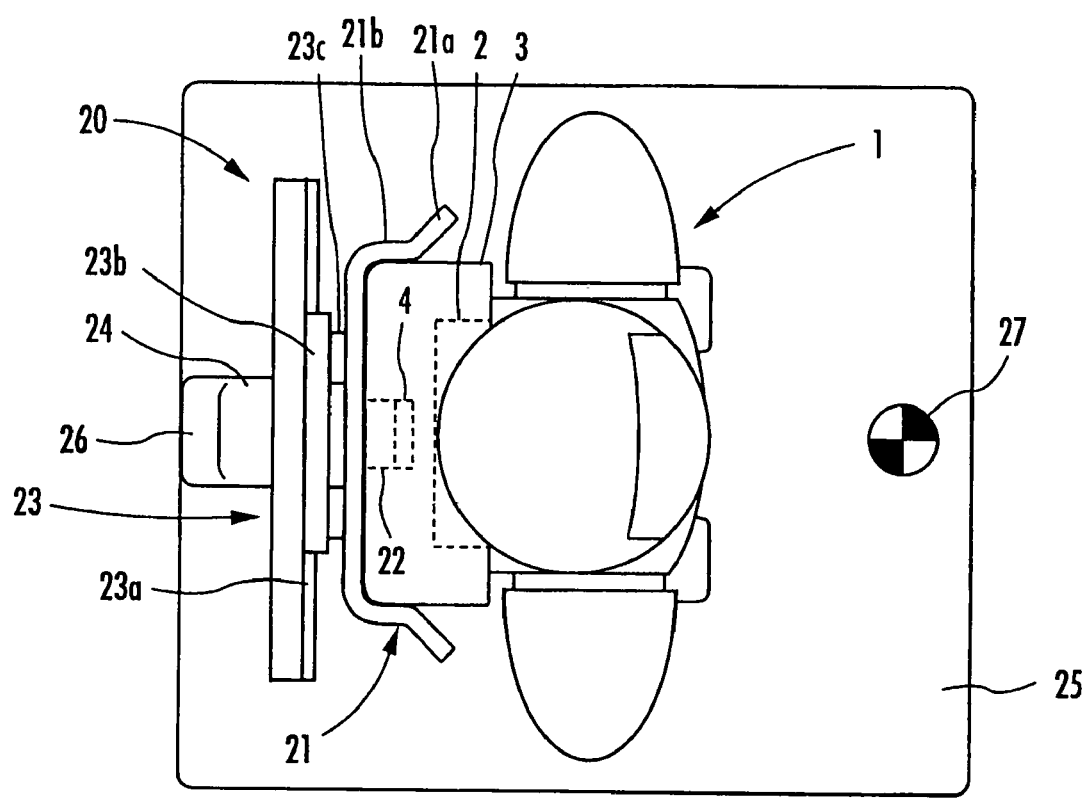
FIG. 2 is a plan view of the robot shown in FIG. 1 and some components arranged in a rear cover of the robot.
Figure 3A:
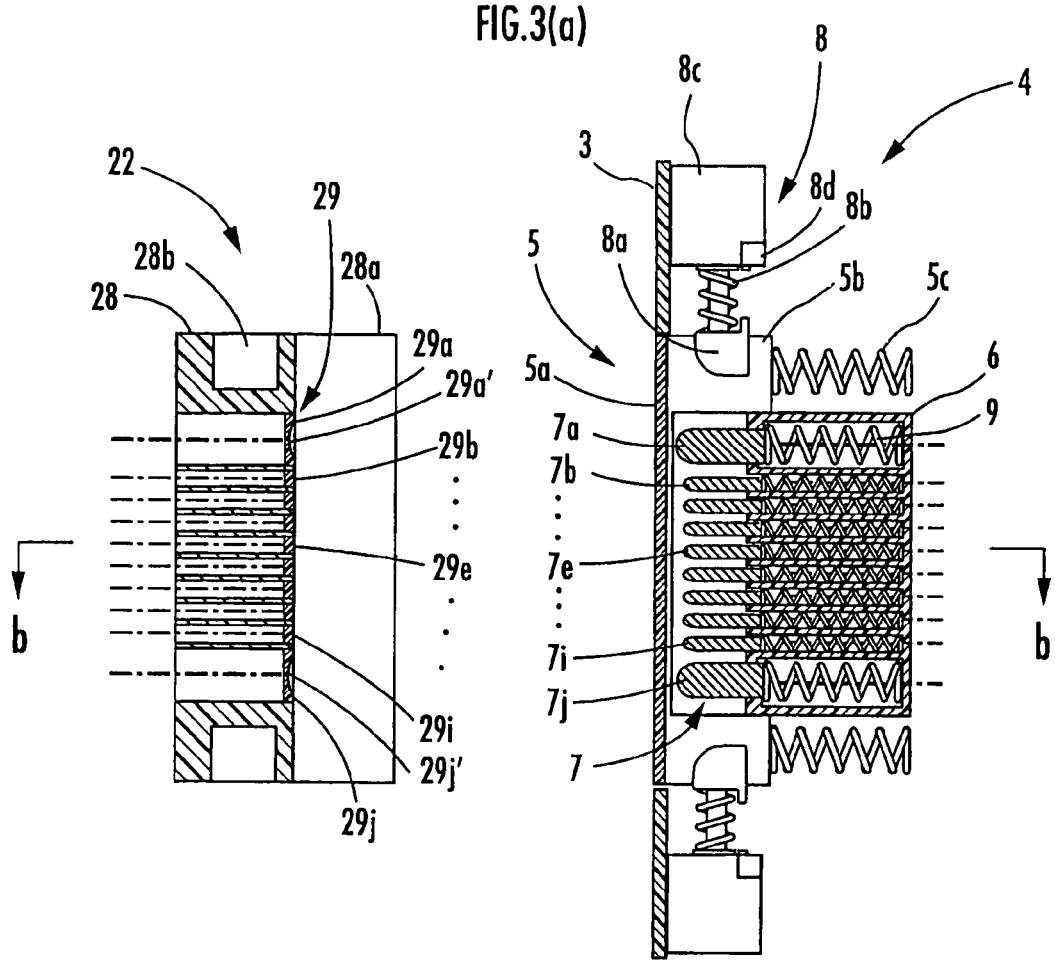
FIGS. 3(a) and 3(b) are cross-sectional views of a power supplying connector and a power receiving connector.
Figure 3B:
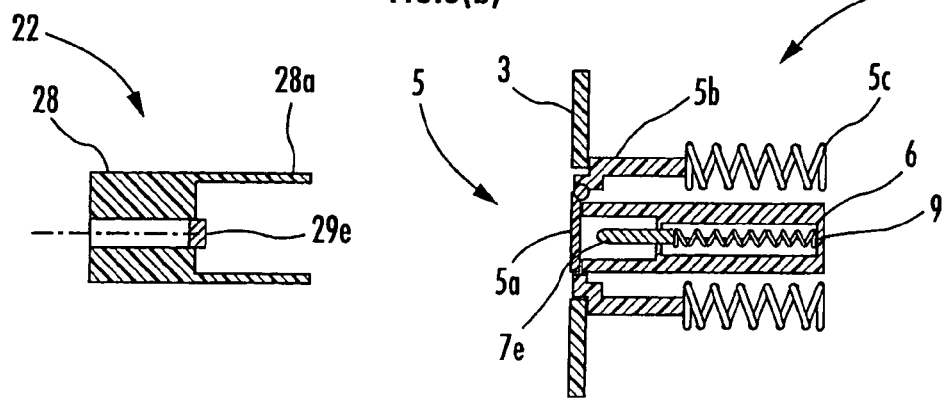
Figure 4:
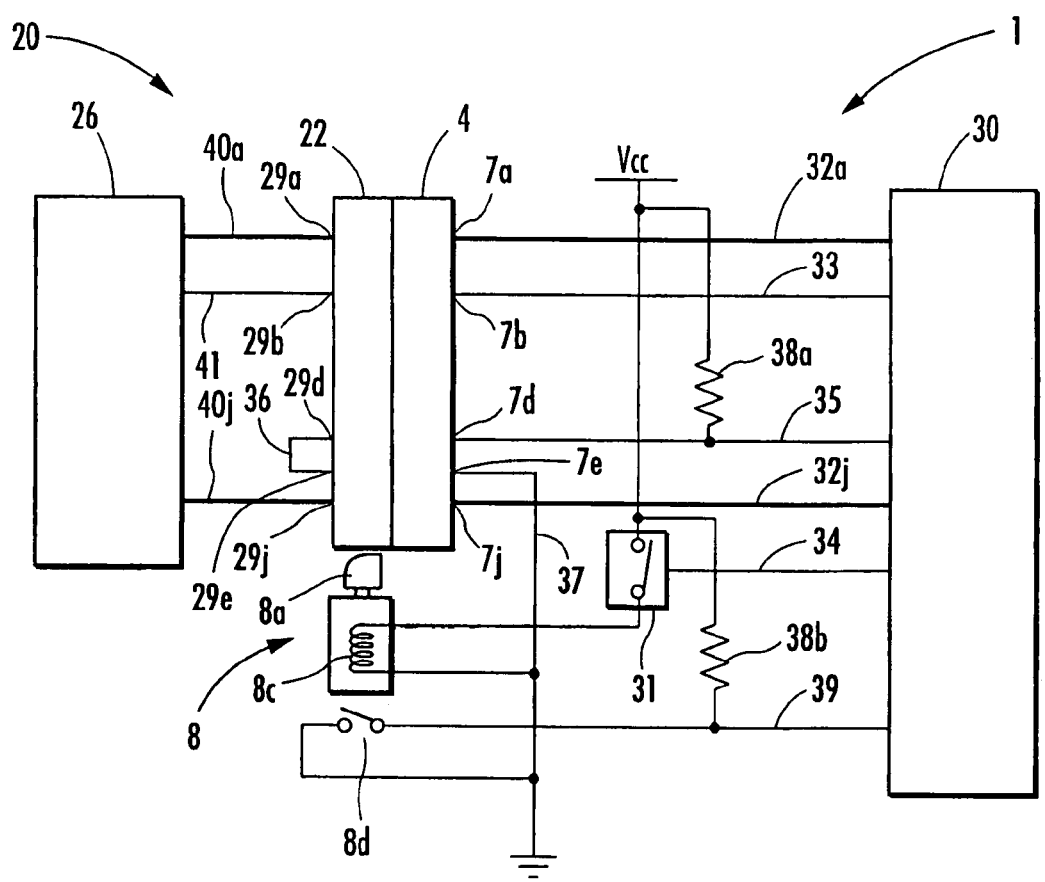
FIG. 4 is a circuit diagram of the charging system according to this embodiment.
Figure 5:
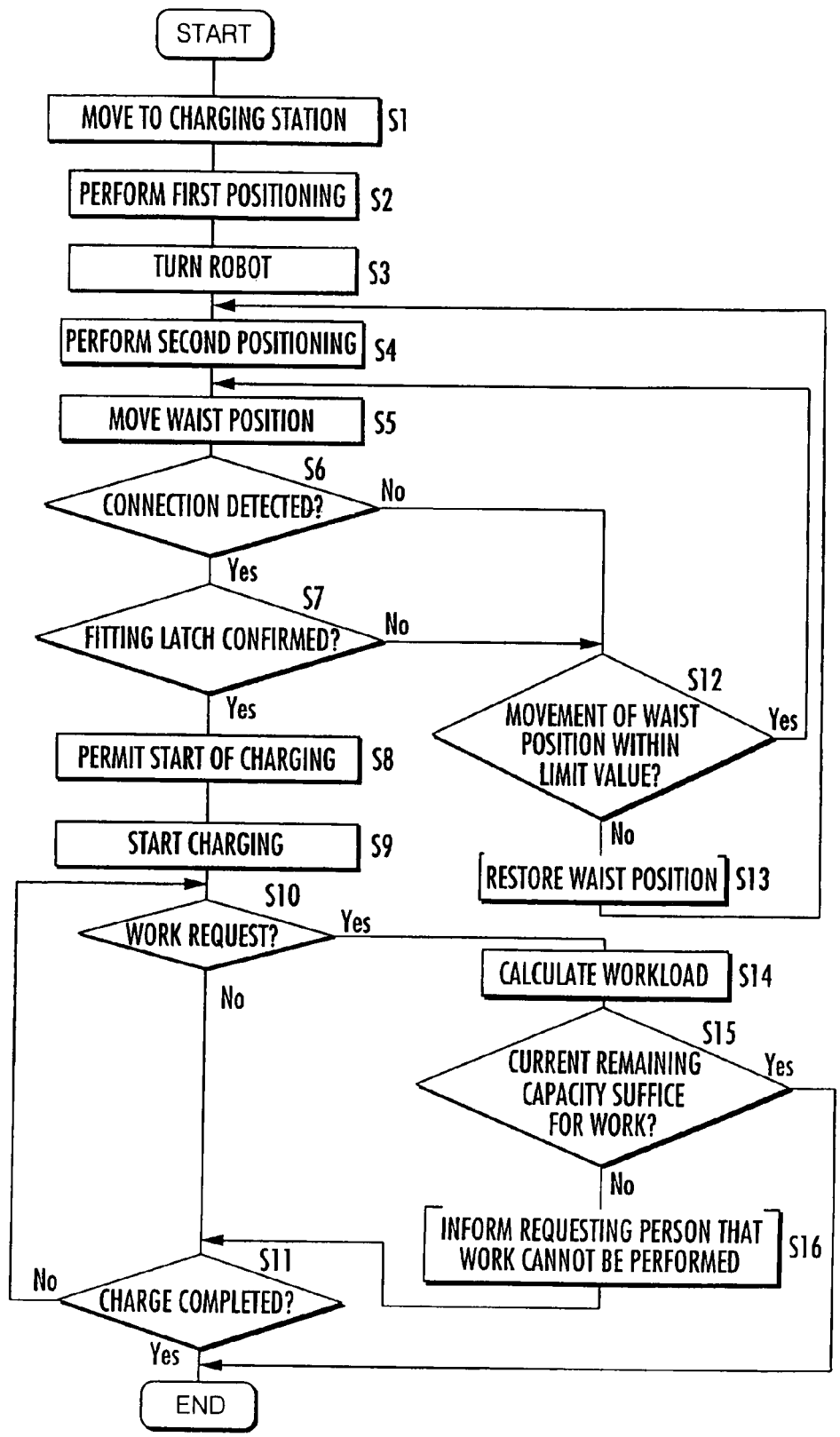
FIG. 5 is a flowchart illustrating a charging operation of the robot.
Figure 6A:
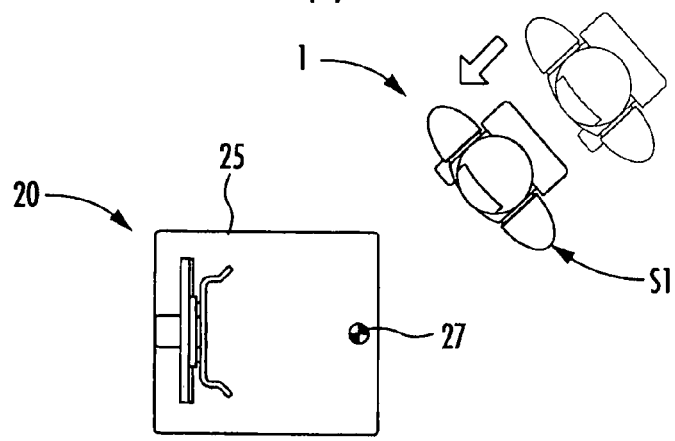
FIG. 6 includes diagrams for illustrating the charging operation of the robot.
Figure 6B:
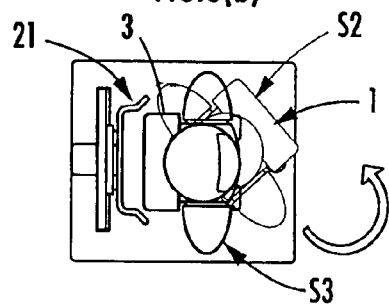
Figure 6C:
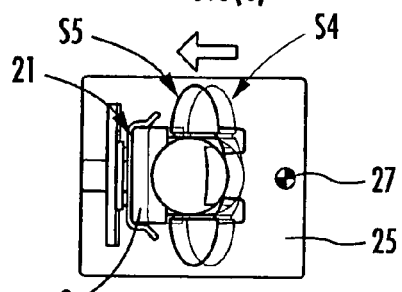
Figure 6D:
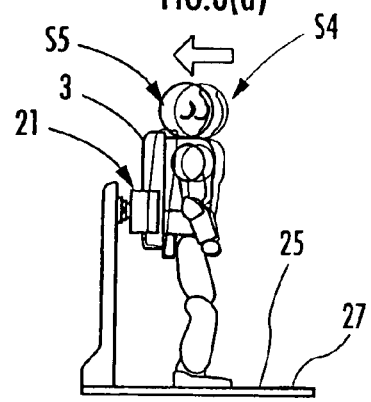
Figure 7A:
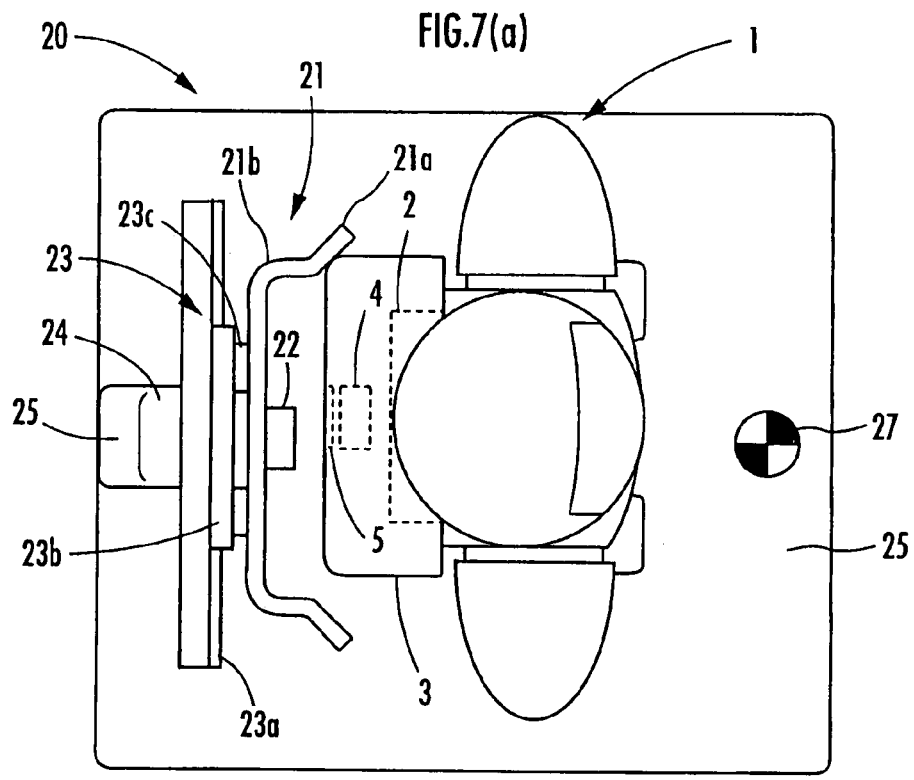
FIGS. 7(a) and 7(b) are diagrams for illustrating a connecting operation in the case where the robot and the charging station are misaligned with each other.
Figure 7B:
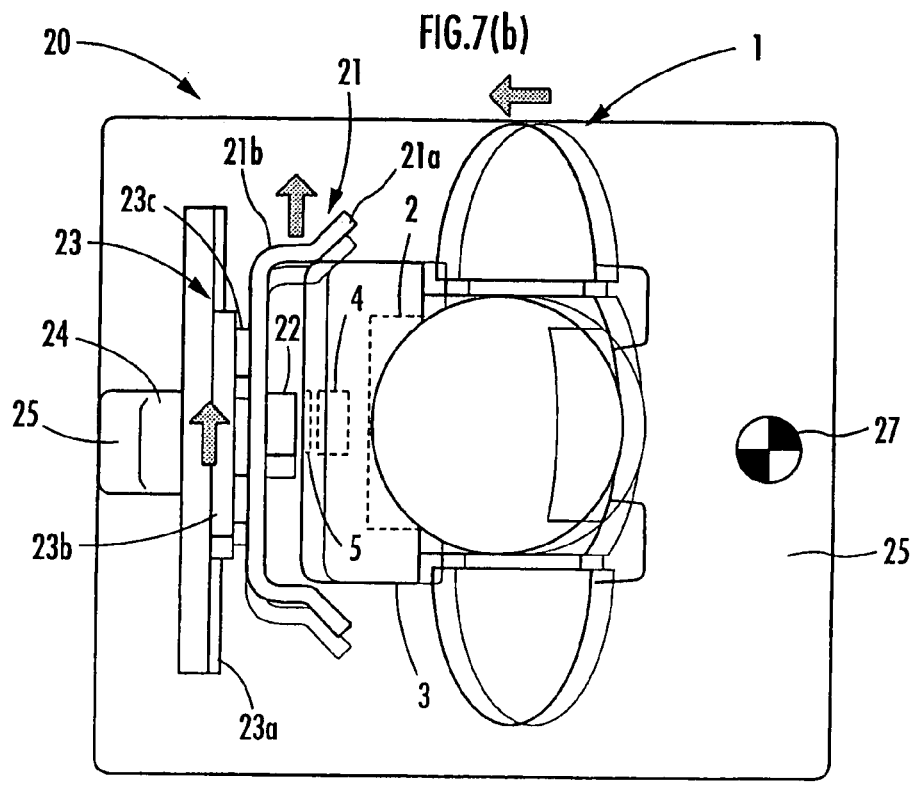
Figure 8A:
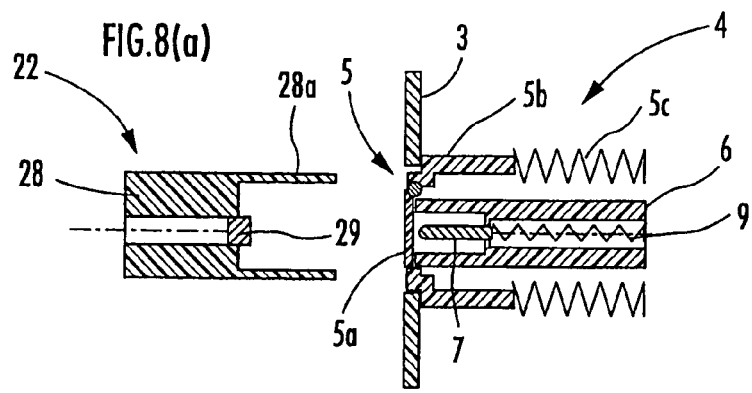
FIGS. 8(a) to 8(d) are diagrams for illustrating connection between the power receiving connector and the power supplying connector.
Figure 8B:
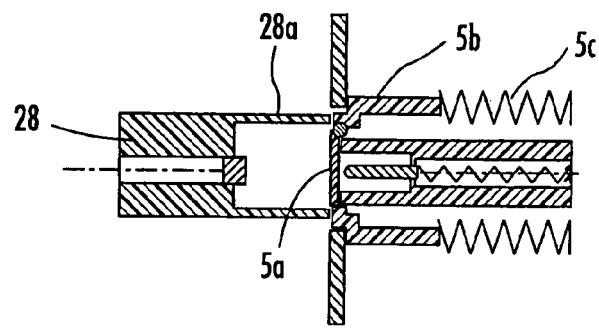
Figure 8C:
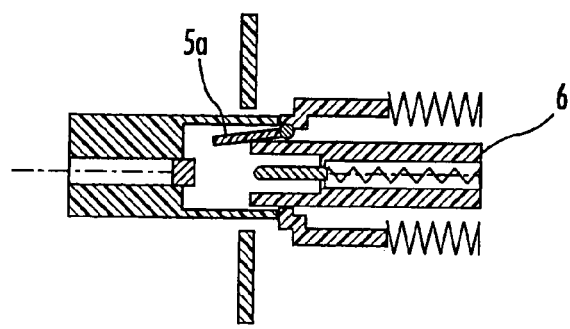
Figure 8D:
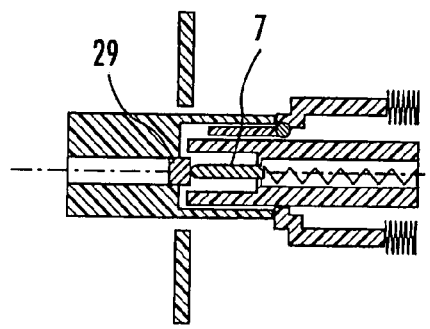
Figure 9:
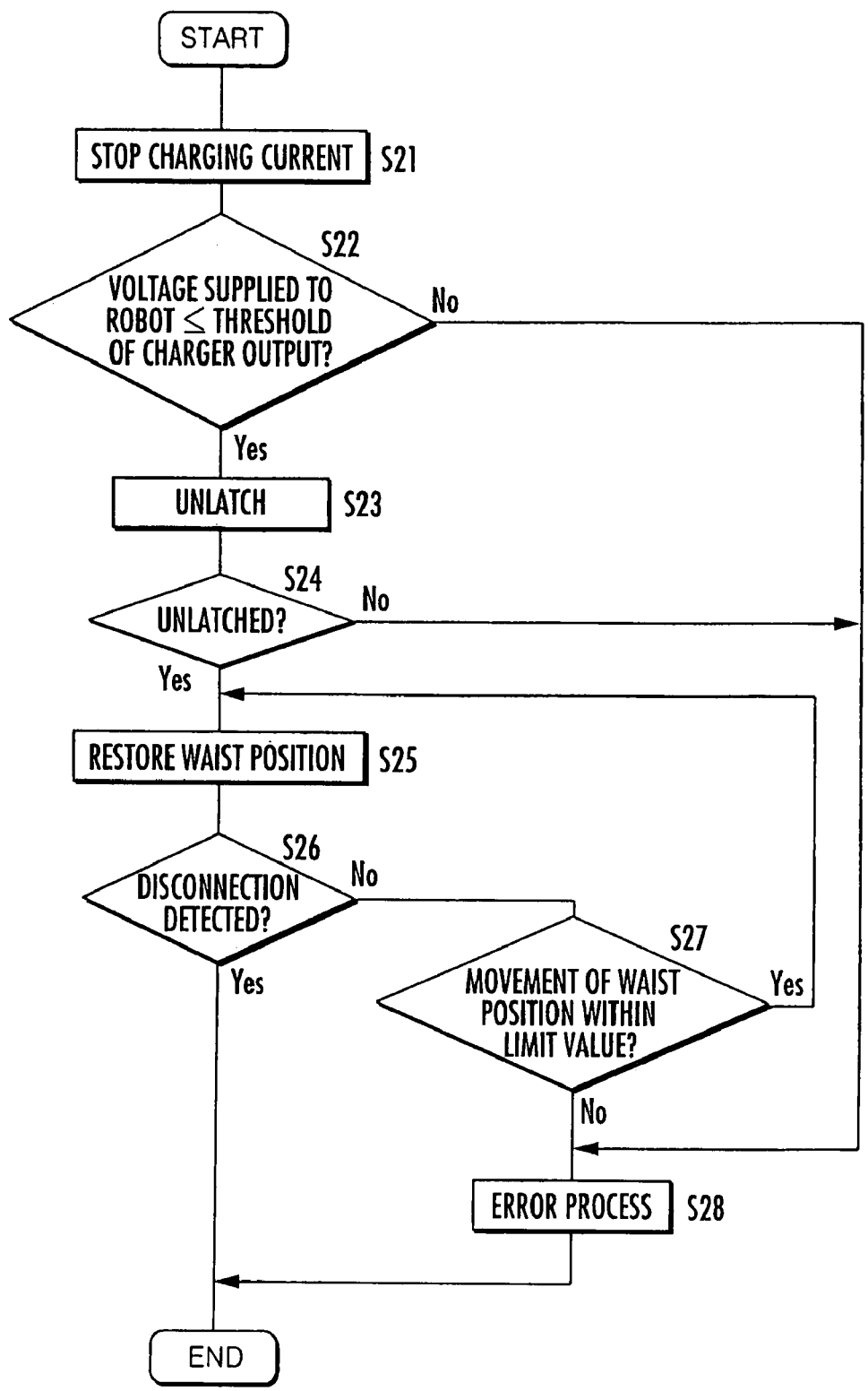
FIG. 9 is a flowchart illustrating an operation of disconnecting the power receiving connector and the power supplying connector from each other.

Now, a charging system according to an embodiment of the present invention will be described with reference to FIGS. 1 to 9. FIG. 1 is a diagram showing a robot that is being charged on a charging station of the charging system according to this embodiment. FIG. 2 is a plan view of the robot shown in FIG. 1 and some components arranged in the rear cover of the robot. FIG. 3(a) is a cross-sectional view of a power supplying connector and a power receiving connector, and FIG. 3(b) is a cross-sectional view taken along the line b-b in FIG. 3(a). FIG. 4 is a circuit diagram of the charging system according to this embodiment. FIG. 5 is a flowchart illustrating a charging operation of the robot. FIGS. 6(a) to 6(d) are diagrams for illustrating the charging operation of the robot. FIGS. 7(a) and 7(b) are diagrams for illustrating a connecting operation in the case where the robot and the charging station are misaligned with each other. FIGS. 8(a) to 8(d) are diagrams for illustrating connection between the power receiving connector and the power supplying connector. FIG. 9 is a flowchart illustrating an operation of disconnecting the power receiving connector and the power supplying connector from each other.

As shown in FIG. 1, the charging system for a legged mobile robot has a charging station 20 that charges a battery 2 of a legged mobile robot 1. The charging station 20 comprises a holder (guide means) 21 that holds a rear cover 3 provided on the back of the robot 1, a power supplying connector 22 provided on the holder 21, a slide mechanism (moving means) 23 that holds the holder 21 and the power supplying connector 22 in a horizontally movable manner, a support strut 24 that supports the slide mechanism 23, a base plate 25 that supports the support strut 24 in an upright position, and a charging power supply 26 that charges the battery 2 of the robot 1. In addition, on the surface of the base plate 25, there is provided a reference position mark 27 for the robot 1 to recognize the stopping position using a visual sensor (not shown) provided in the head of the robot 1.

As shown in FIG. 2, the holder 21 has first guide sections 21a that horizontally radially extend toward the robot 1 and a second guide section 21b that is substantially U-shaped when observed from a top view to conform to the contour of the rear cover 3 of the robot 1. According to this embodiment, the first guide sections 21a and the second guide section 21b constitute the guide means. The slide mechanism 23 has a slide rail 23a that extends horizontally and is fixed to the support strut 24 and a slide block 23b that can move horizontally along the slide rail 23a. The holder 21 is fixed to the slide block 23b via a rubber bush 23c. This allows the holder 21 to move vertically and horizontally relative to the slide block 23b to some extent.

Furthermore, as shown in FIG. 2, the power supplying connector 22 extends forward (rightward in the drawing) from the center of the holder 21. As shown in FIGS. 3(a) and 3(b), the power supplying connector 22 has a block-shaped power supplying connector housing 28 and a power supplying terminal 29 in the power supplying connector housing 28. As shown in FIGS. 3(a) and 3(b), the power supplying connector housing 28 has protrusion members 28a that protrude toward the power receiving connector 4. In addition, the power supplying connector housing 28 has latch fixing holes 28b, into which a fitting latch 8 described later is inserted, formed in both lateral side surfaces thereof. The power supplying terminal 29 is composed of a pair of charging terminals 29a and 29j and eight signal terminals 29b to 29i for signal transmission. The charging terminals 29a and 29j are disposed on both lateral sides of the signal terminals 29b to 29i. Furthermore, as shown in FIG. 3(a), the charging terminals 29a and 29j of the power supplying terminal 29 are flat terminals having recesses 29a' and 29j' in the contact surface, respectively, and the signal terminals 29b to 29i are flat terminals that have a flat contact surface.

Now, referring to FIGS. 2, 3(a) and 3(b), an arrangement of the power receiving connector 4 provided on the robot 1 will be described. The power receiving connector 4 is provided in the rear cover 3 of the robot 1 along with the battery 2 and is shielded from the outside of the rear cover 3 by a movable shutter member (lid member) 5 except during charging as shown in FIGS. 3(a) and 3(b). The movable shutter member 5 is composed of a shutter 5a that covers the surface of the power receiving connector 4, a shutter case 5b that holds one edge of the shutter 5a so that the shutter 5a can pivot about the edge, and a shutter spring 5c that biases the shutter case 5b toward the surface of the rear cover 3.

As shown in FIGS. 3(a) and 3(b), the power receiving connector 4 has a power receiving connector housing 6 and a power receiving terminal 7 capable of moving back and forth provided in the power receiving connector housing 6. In addition, on both lateral sides of the power receiving connector housing 6, the power receiving connector 4 has a pair of fitting latches 8 capable of moving back and forth in a direction perpendicular to the direction of attachment and detachment of the power supplying connector 22. The power receiving terminal 7 is composed of charging terminals 7a and 7j to which a charging current is supplied and eight signal terminals 7b to 7i for signal transmission. The charging terminals 7a and 7j are disposed on both lateral sides of the signal terminals 7b to 7i. The charging terminals 7a and 7j and the signal terminals 7b to 7i have a semispherical tip and are spring-pin-type terminals that are biased toward the power supplying terminal 29 by a spring 9. The charging terminals 7a and 7j extend toward the power supplying connector 22 beyond the tips of the signal terminals 7b to 7i.

As shown in FIG. 3(a), the fitting latch 8 has a claw member 8a that can move back and forth and has a chamfered, arc-shaped edge at one side at which the claw member 8a comes into contact with the power supplying connector 22, a spring 8b for biasing the claw member 8a in a direction that the claw member 8a protrudes, a solenoid 8c for pulling the claw-member 8a in a direction that the claw member 8a is retracted, and an unlatching detection switch 8d that detects unlatching when the claw member 8a is kept in the retracted position. According to this embodiment, the fitting latches 8 and the latch fixing holes 28b formed in the power supplying connector 22 constitute a locking mechanism.

Now, referring to FIG. 4, a circuit diagram of the charging system will be described. The robot 1 has a controller 30 that controls the operations of the arms, the legs and the like of the robot 1 and serves as charge control means during charging, and an unlatching switch 31 that performs unlatching using the solenoid 8c of the fitting latch 8. In addition, the robot 1 has a pair of charging lines 32a and 32j connected to the charging terminals 7a and 7j, a power supply output OFF line 33 connected to the signal terminal 7b for transmitting a power supply output OFF signal, and an unlatching command line 34 that connects the unlatching switch 31 and the controller 30 to each other. The controller 30 and the signal terminal 7d of the power-receiving connector 4 are connected to each other via a connection detection line 35.

When the power receiving connector 4 is connected to the power supplying connector 22, the connection detection line 35 is connected to the signal terminal 7e of the power receiving connector 4 via a line 36 described later and grounded via a line 37. Furthermore, the connection detection line 35 is connected to a power supply Vcc via a resistor 38a. The unlatching switch 31 is intended to interrupt electric power supply from the power supply Vcc to the solenoid 8c, the line to the power supply Vcc is connected to an unlatching command line 39 via a resistor 38b, and the unlatching command line 39 is connected to the unlatching detection switch 8d.

The charging station 20 has a pair of charging lines 40a and 40j extending from the charging power supply 26 and connected to the charging terminals 29a and 29j, a power supply output OFF line 41 connected to the signal terminal 29b for receiving the power supply output OFF signal, and a line 36 that connects the signal terminals 29d and 29e to each other. According to this embodiment, the controller 30, the connection detection line 35, the line 36 and the line 37 constitute connection detecting means.

Now, referring to FIGS. 5 and 6, a charging operation of the robot 1 will be described. First, when the controller 30 determines that the battery 2 has to be charged because the remaining capacity of the battery 2 becomes lower than a predetermined level, for example, the robot 1 searches for and locates the charging station 20 with the visual sensor (not shown). Once the visual sensor locates the charging station 20, the controller 30 makes the robot 1 move to a predetermined position near the charging station 20 (step S1). Then, the robot 1 performs a first positioning to a predetermined position on the base plate 25 of the charging station 20 (step S2). Then, the robot 1 makes a 180-degree turn to aim the rear cover 3 at the holder 21 (step S3). Then, the robot 1 determines the position at which the robot 1 should rest with reference to the reference position mark 27 on the surface of the base plate 25 of the charging station 20 and performs a second positioning (step S4). Then, the robot 1 shifts the center of gravity rearward to displace the waist rearward, thereby bringing the rear cover 3 close to the holder 21 (step S5).

At this time, if the holder 21 and the rear cover 3 are slightly horizontally misaligned with each other as shown in FIG. 7(a), the holder 21 is aligned to the rear cover 3 as described below. First, the rear cover 3 abuts against the first guide section 21a of the holder 21. If the rear cover 3 further moves toward the holder 21 from this state, the rear cover 3 pushes the holder 21 leftward in FIG. 7(a). Since the slide mechanism 23 enables the holder 21 to move horizontally, when the rear cover 3 pushes the first guide section 21a of the holder 21, the holder 21 slides upward in FIG. 7 (b). And the rear cover 3 is guided by the first guide section 21a of the holder 21 and housed in the second guide section 21b. In this way, the power receiving connector 4 and the power supplying connector 22 are horizontally aligned with each other.

As for vertical alignment between the power receiving connector 4 and the power supplying connector 22, since the robot 1 is charged on the base plate 25 of the charging station 20, and the height of the power receiving connector 4 of the robot 1 can be readily controlled, vertical misalignment between the connectors is unlikely to occur. Therefore, according to this embodiment, the holder 21 does not have a vertical alignment mechanism like the horizontal slide mechanism but has a simple mechanism, such as the rubber bush 23c.

Now, referring to FIG. 8, an operation of connecting the power receiving connector 4 to the power supplying connector 22 will be described. As the rear cover 3 of the robot 1 is guided by the second guide section 21b of the holder 21, the state shown in FIG. 8(a) changes to the state shown in FIG. 8(b). Specifically, the protrusion members 28a of the power supplying connector housing 28 comes into contact with the shutter case 5b of the movable shutter member 5. The protrusion members 28a of the power supplying connector housing 28 are formed to abut against the shutter case 5b at both lateral sides of the shutter 5a in the side view. Therefore, if the power supplying connector housing 28 is pushed rightward in FIG. 8(b), the shutter case 5b moves rightward while pushing the shutter spring 5c. Thus, as shown in FIG. 8(c), the shutter 5a is pushed by the power receiving connector housing 6 and opened. Then, if the power supplying connector housing 28 is further pushed rightward from the state shown in FIG. 8(c), the power supplying terminal 29 and the power receiving terminal 7 come into contact with each other and are connected to each other as shown in FIG. 8(d).

Since the charging terminals 7a and 7j of the power receiving terminal 7 protrude toward the power supplying connector 22 beyond the tips of the signal terminals 7b to 7i as shown in FIG. 3(a), when the power receiving connector 4 and the power supplying connector 22 are connected to each other, the charging terminals 7a and 7j first come into contact with the charging terminals 29a and 29j. Then, when the power receiving connector 4 and the power supplying connector 22 move closer to each other, the springs 9 of the charging terminals 7a and 7j are pressed, and the signal terminals 7b to 7i come into contact with the signal terminals 29b to 29i.

Once the signal terminal 7d and the signal terminal 29d come into contact with each other, as shown in the circuit diagram of FIG. 4, the connection detection line 35 is grounded via the line 36 on the power supplying connector 22, the signal terminal 7e and the line 37, and thus, connection between the power receiving terminal 7 and the power supplying terminal 29 is detected (Yes in step S6). If the unlatching detection switch 8d is not opened in this state, the controller 30 determines that the fitting latches 8 are normally fitted into the latch fixing holes 28b (Yes in step S7). When the controller 30 confirms that the power supplying connector 22 and the power receiving connector 4 are connected to each other through the process described above, the controller 30 permits the charging operation (step S8), allowing the charging power supply 26 to supply a charging current to the battery 2 via the charging terminals 29a and 29j and the charging terminals 7a and 7j, thereby charging the battery 2 (step S9).

Then, except the case where a work request is externally received (No in step S10), charging of the battery continues until the controller 30 confirms that the battery 2 is completely charged (Yes in step S11). If a work request is externally received (if Yes in step S10), the controller 30 extracts a work model, which is the same as or similar to the requested work, from a plurality of work models stored in a storage device (not shown) of the controller 30 and calculates the workload (step S14). Then, based on the calculated workload, the controller 30 determines whether the current remaining capacity of the battery 2 suffices for the work (step S15) and, if the current remaining capacity suffices for the work, terminates the charging operation and carries out the requested work. If the current remaining capacity of the battery does not suffice for the requested work, the controller 30 informs the person who has requested the work that the work cannot be carried out (step S16) and continues the charging operation (No in step S11).

According to this embodiment, the slide mechanism 23 enables wide horizontal movement of the holder 21. In addition, the power receiving terminal 7 is a spring-pin-type terminal, the power supplying terminal 29 is a flat terminal, and such characteristics of the terminals can also help to accommodate misalignment between the terminals to some extent. Therefore, in most cases, charging of the robot 1 can be accomplished by the process described above. However, in the case where connection between the power receiving terminal 7 and the power supplying terminal 29 is not detected in step (S6) described above within a predetermined time from the time when the rear cover 3 is brought close to the holder 21 in step (S5) described above for some reason, or in the case where fitting of the fitting latches 8 into the latch fixing holes 28b is not confirmed in step (S7) described above, an error process is carried out as described below.

First, the robot 1 detects the deviation of the standing position thereof from the lateral center position of the charging station 20 by means of the visual sensor (not shown) that detects the reference position mark 27 on the base plate 25. If the deviation falls within a limit value and can be compensated for only by moving the waist, without moving the legs (Yes in step S12), the robot 1 moves the waist to adjust the position of the power receiving connector 4 (step S5). On the other hand, if the deviation exceeds the limit value and cannot be compensated for without the leg movement (No in step S12), the position of the waist is restored to the position before connection (step S13), and the second positioning is carried out again (step S4).

Now, referring to FIGS. 5, 4 and 9, an operation of separating the robot 1 being charged from the charging station 20 will be described. First, referring to FIG. 5, when the charging is completed (Yes in step S11), or when a work is externally requested, and the work can be carried out (Yes in step S15), a separation operation described below is started. First, referring to FIG. 4, the controller 30 transmits the power supply-output OFF signal to the charging station 20 via the power supply output OFF lines 33 and 41. As a result, the charging current supplied from the charging power supply 26 to the battery 2 is interrupted (step S21).

Then, when the voltage between the paired charging terminals 7a and 7j becomes lower than a predetermined threshold (Yes in step S22), the controller 30 performs the unlatching process of the fitting latches 8 (step S23). The unlatching process of the fitting latches 8 is performed with the unlatching switch 31 closed by the controller 30 and the solenoid 8c energized by the power supply Vcc. As a result of the unlatching process, the claw members 8a are drawn toward the respective solenoids 8c and disengaged from the latch fixing holes 28b in the power supplying connector housing 28 of the power supplying connector 22, so that the power receiving connector 4 and the power supplying connector 22 can be disconnected from each other. At the same time, the unlatching detection switch 8d is turned on, and the controller 30 is informed of the unlatching of the fitting latches 8 (Yes in step S24).

When the controller 30 confirms the unlatching of the fitting latches, the controller 30 controls the robot 1 to move the waist of the robot 1 back to the position before charging (step S25). When the power receiving connector 4 and the power supplying connector 22 are disconnected from each other by this operation, the signal terminals 7b to 7i and the signal terminals 29b to 29i are also disconnected from each other, so that the connection detection line 35 is opened. Thus, the controller 30 confirms that the power receiving connector 4 and the power supplying connector 22 are normally disconnected from each other (Yes in step S26). In this way, separation of the robot 1 from the charging station 20 is completed. At this time, the shutter spring 5c pushes the shutter case 5b, so that the state shown in FIG. 8(d) changes back to the state shown in FIG. 8(a), and the front of the power receiving connector 4 is closed by the shutter 5a.

If the voltage between the paired charging terminals 7a and 7j does not become lower than the predetermined threshold in step (S22) described above, if the unlatching of the fitting latches 8 is not detected in step (S24) described above, or if it is determined that the waist of the robot 1 has to be moved beyond a limit value in step (S27), an error process is carried out by informing the abnormality by an alarm or the like provided in the robot 1, for example (step S28).

The charging system according to this embodiment can charge the robot 1 without laterally moving the center of gravity of the robot 1, so that the robot 1 can be easily controlled during charging. In addition, since the center of gravity of the robot 1 does not laterally move, and the robot 1 can lean against the charging station 20 during charging, the power required to maintain the posture of the robot 1 during charging can be reduced. In addition, since the power receiving terminal 7 is housed in the rear cover 3 of the robot 1 except during charging, there is no possibility that the power receiving terminal 7 comes into contact with an outside obstacle and is damaged thereby when the robot 1 moves.

In addition, since the charging terminals 7a and 7j of the power receiving terminal 7 protrude toward the power supplying connector 22 beyond the tips of the signal terminals 7b to 7i, spark discharge can be prevented from occurring on the signal terminals 7b to 7i, so that deterioration of the terminals due to the spark discharge can be prevented. The charging terminals 29a and 29j of the power supplying connector 22 have the recesses 29a' and 29j', respectively, formed in the contact surface, and the charging terminals 7a and 7j of the power receiving connector 4 have the semispherical tip. Therefore, the charging connectors 29a and 29j and the charging connectors 7a and 7j are in surface contact with each other over a wide contact area. As a result, the resistance between the terminals is reduced.

According to the embodiment described above, the holder 21 has the first guide sections 21a and the second guide section 21b. However, the present invention is not limited thereto, and the holder 21 may have only a component like the first guide sections 21a, which extend horizontally radially toward the robot 1. Furthermore, according to this embodiment, the holder 21 and the slide block 23b are coupled with each other by the rubber bush 23c. However, the present invention is not limited thereto, and a slide mechanism capable of moving vertically and horizontally may be provided to enable the slide block 23b to slide not only horizontally but also vertically.

Figure 10:
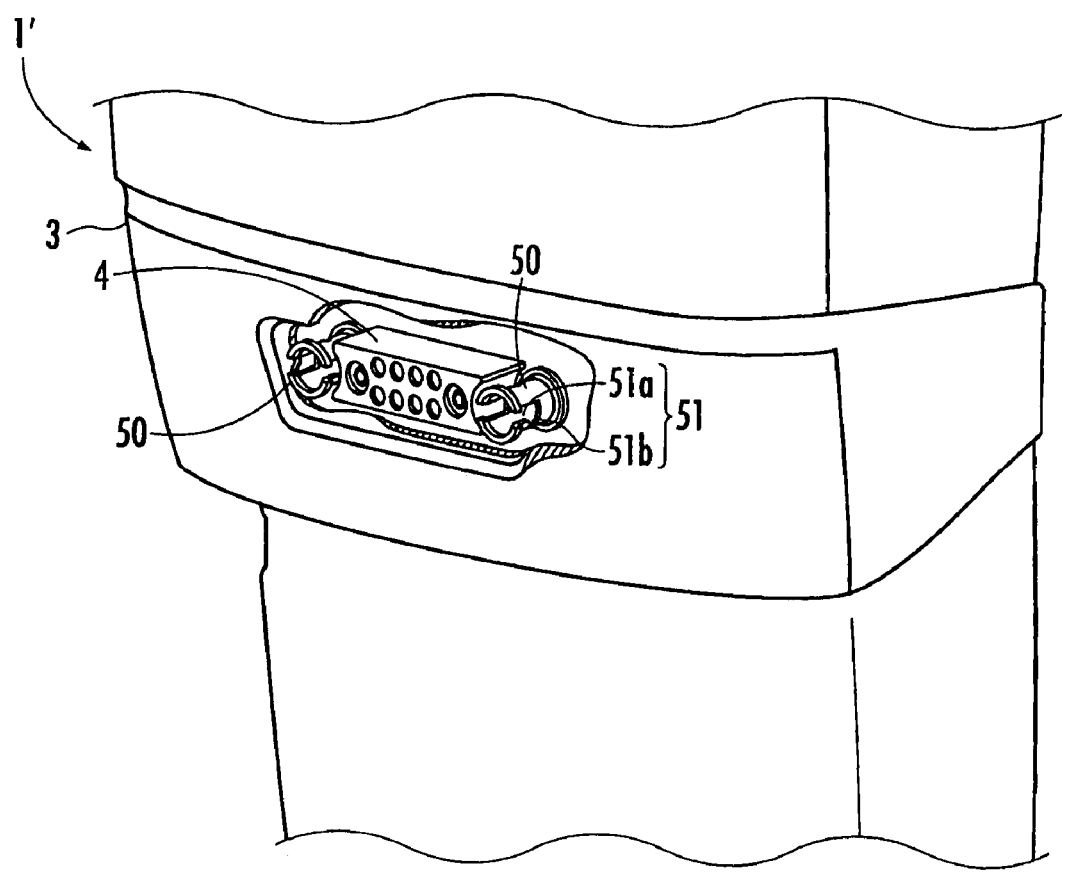
FIG. 10 is a diagram illustrating an arrangement of a power receiving connector and the like in the rear cover of a robot according to a second embodiment.
Figure 11:
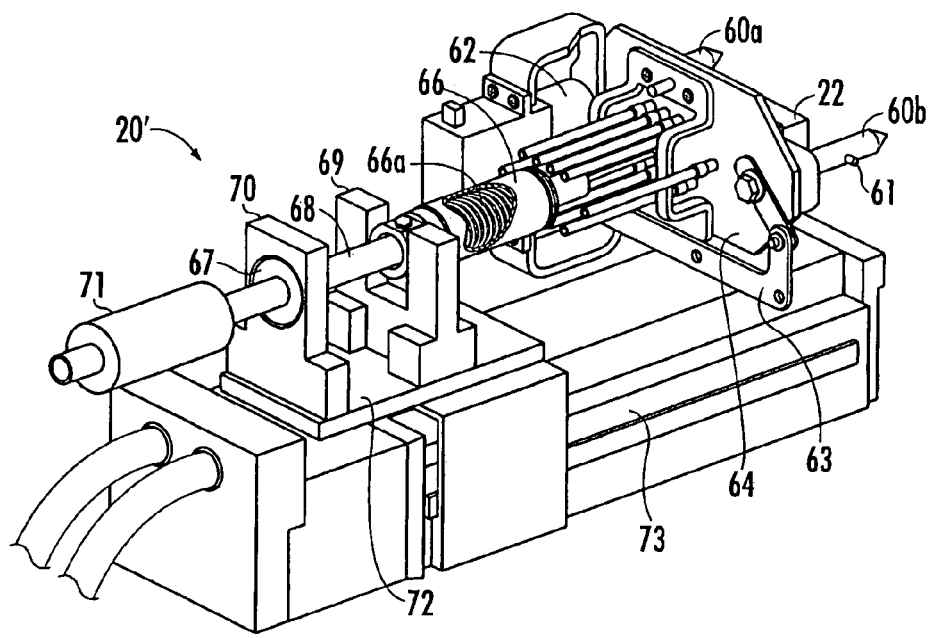
FIG. 11 is a diagram illustrating an arrangement of essential internal components of a charging station according to the second embodiment.
Figure 12:
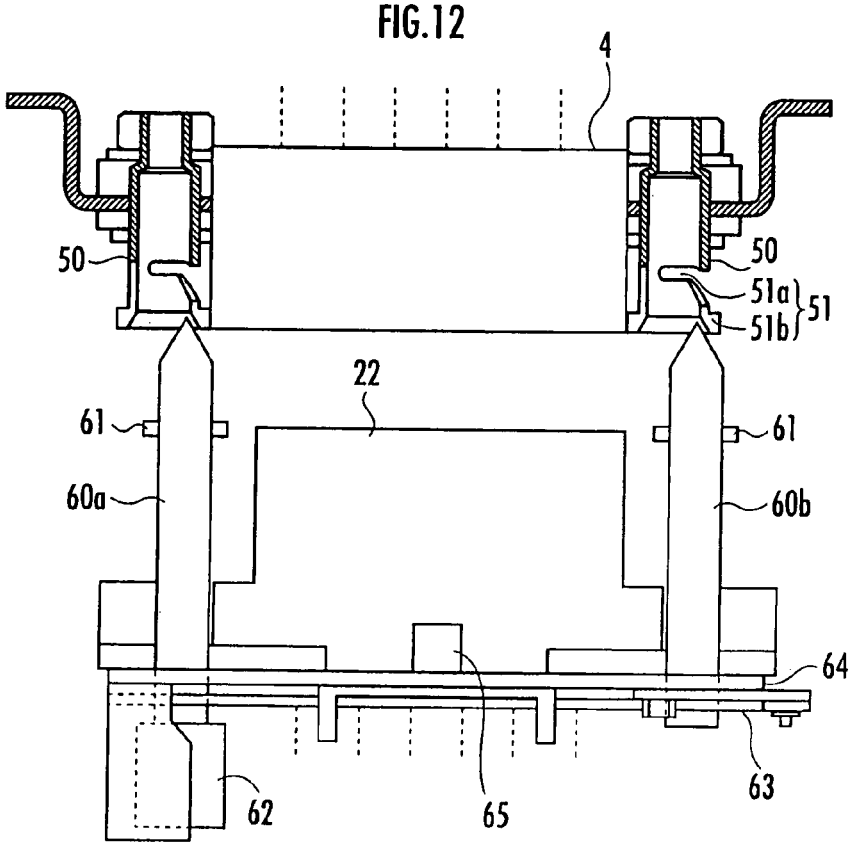
FIG. 12 is a diagram illustrating connection between a power receiving connector and a power supplying connector according to the second embodiment.

Now, a charging system for a legged mobile robot according to a second embodiment of the present invention will be described with reference to FIGS. 10 to 12. FIG. 10 is a diagram illustrating an arrangement of a power receiving connector and the like in the rear cover of a robot according to the second embodiment. FIG. 11 is a diagram illustrating an arrangement of essential internal components of a charging station according to the second embodiment. FIG. 12 is a diagram showing connection between a power receiving connector and a power supplying connector according to the second embodiment. In the following description of the second embodiment, the same components as in the embodiment described above are denoted by the same reference numerals, and detailed description thereof will be omitted. Furthermore, in FIG. 10, illustration of the shutter member of a rear cover 3 of a robot 1' is omitted.

The charging system according to the second embodiment has a charging station 20' that charges a battery 2 (see FIG. 1) of a legged mobile robot 1'. The charging system has a power receiving connector 4 shown in FIG. 10 and a power supplying connector 22 shown in FIG. 11 that are the same as those in the embodiment described above and a circuit arrangement that is the same as that shown in FIG. 4 except for the part involved with the fitting latch 8. On the other hand, generally, the charging system according to the second embodiment has guide means, a locking mechanism and moving means that are different from those according to the embodiment described above.

According to the second embodiment, the guide means is composed of a pair of guide sleeves 50 provided on the robot 1' and a pair of guide pins 60 (60a, 60b) provided on the charging station 20'. As shown in FIG. 10, the guide sleeves 50 are metal cylinders having a widened open end. The guide sleeves 50 are disposed on the left and right sides of the power receiving connector 4 on the robot 1'. As shown in FIG. 11, the guide pins 60a and 60b are circular columns made of metal having a conical tip. The guide pins 60a and 60b are disposed on the left and right sides of the power supplying connector 22 on the charging station 20'.

According to the second embodiment, the locking mechanism is composed of guide slits 51 formed in the guide sleeves 50, engaging pins (engaging protrusions) 61 formed on the periphery of the guide pins 60 and capable of moving in the guide slits 51, a guide pin motor 62 (rotating means) for rotating the guide pin 60a of the pair of guide pins 60a and 60b, and a linkage mechanism 63 coupled to the guide pin motor 62 to rotate the other guide pin 60b. The guide slit 51 is composed of a longitudinal slit 51a extending in the axial direction of the guide sleeve 50 toward the open end thereof and an engaging slit 51b extending in the circumferential direction of the guide sleeve 50 from the inner end of the longitudinal slit 51a. A pair of such guide slits 51 are formed in the left and right walls of the guide sleeve 50. Furthermore, The engaging slits 51b of the paired guide slits 51 extend in the same direction (clockwise in the second embodiment) when seen from the side of the open end of the guide sleeve 50. The engaging pins 61 are circular columns made of metal, which penetrate through the respective guide pins 60 and are fixed thereto.

The guide pin motor 62 is disposed at the bottom of the guide pin 60a and fixed to a connector holder 64 that holds the power supplying connector 22 and the guide pins 60a and 60b. The linkage mechanism 63 is a member that couples the rotary part of the guide pin motor 62 to the other guide pin 60b, thereby rotating the other guide pin 60b in addition to the guide pin 60a. Furthermore, the connector holder 64 has a position sensor 65 for detecting the position of the robot 1' on the surface facing the robot 1'. The position sensor 65 detects that the guide pins 60 are inserted into the respective guide sleeves 50, and the engaging pins 61 reach the inner ends of the longitudinal slits 51a of the guide slits 51 based on the distance between the rear cover 3' of the robot 1' and the position sensor 65.

In addition, according to the second embodiment, the moving means is composed of a first rubber floating 66 and a second rubber floating 67 (floating part) shown in FIG. 11. The first rubber floating 66 has a cylindrical shape and has a coil spring 66a integrally formed therein. With such a configuration, the axial length of the first rubber floating 66 can be expanded or shrunk by a predetermined length (about 25 mm in the second embodiment). In addition, as shown in FIG. 11, the first rubber floating 66 couples a supporting rod 68 described later and the rear part of the connector holder 64 to each other.

As shown in FIG. 11, the supporting rob 68 is a cylindrical rod member and is held in the charging station 20' by a fulcrum holder 69, the second rubber floating 67 and a floating holder 70. In addition, the supporting rod 68 has a double-pipe configuration between the connector holder 64 and the fulcrum holder 69, and the distance between the connector holder 64 and the fulcrum holder 69 can be changed. Since the connector holder 64 and the supporting rod 68 are coupled to each other by the first rubber floating 66, the distance between the connector holder 64 and the fulcrum holder 69 can be changed by about 25 mm.

The second rubber floating 67 is a circular column member, through the center of which the supporting rod 68 penetrates, and is held by the floating holder 70 at the periphery thereof. Since the supporting rod 68 is supported by the second rubber, floating 67, the supporting rod 68 can radially move by a predetermined amount (about 4 mm in the second embodiment) due to the resiliency of the second rubber floating 67. In addition, a balance weight 71 is mounted on the supporting rod 68 at a position behind the second rubber floating 67.

Furthermore, as shown in FIG. 11, the fulcrum holder 69 and the floating holder 70 are both fixed to a supporting plate 72 in the charging station 20'. The supporting plate 72 can be moved in the axial direction of the supporting rod 68 by an axial actuator 73.

Now, operations of the guide means, the locking mechanism and the moving means of the charging system according to the second embodiment will be described. For charging the robot 1', the robot 1' is moved to a predetermined position on the charging station 20' through the steps S1 to S4 shown in FIG. 5. Then, the robot 1' displaces the waist position rearward by displacing the center of gravity as in step S5 shown in FIG. 5, thereby bringing the power receiving connector 4 close to the power supplying connector 22.

At this time, even if the power receiving connector 4 and the power supplying connector 22 are slightly misaligned with each other as shown in FIG. 12, the guide pins 60 can be inserted into the depth of the guide sleeves 50 along the inner surface of the guide sleeves 50, because the tips of the guide pins 60 are conical, and the open ends of the guide sleeves 50 are widened. At this time, the guide pins 60 are fixed to the connector holder 64, the connector holder 64 is coupled to the supporting rod 68, and the supporting rod 68 is supported swingably by the charging station 20' via the fulcrum holder 69 and held by the second rubber floating 67 in such a manner that the supporting rod 68 can radially move by a predetermined amount. As a result, the guide pins 60 can also radially move by the predetermined amount.

In addition, when the robot 1' leans against the charging station 20', the first rubber floating 66 receives the load of the robot 1' in the direction of movement of the robot 1'. Therefore, even if the robot 1' quickly lean against the charging station 20' for some reason, the resiliency of the first rubber floating 66 softens the impact. Thus, the charging system according to the second embodiment can always smoothly establish the connection between the power supplying connector 22 and the power receiving connector 4.

In addition, when the engaging pins 61 on the guide pins 60 are guided by the longitudinal slits 51a of the guide slits 51 in the guide sleeves 50 and inserted to the inner ends of the longitudinal slits 51a, the position sensor 65 detects that the engaging pins 61 on the guide pins 60 reach the inner ends of the longitudinal slits 51a and informs a controller 30 of that. In response to this information, the controller 30 makes the guide pin motor 62 rotate the guide pin 60a and the linkage mechanism 63 rotate the other guide pin 60b, thereby making the engaging pins 61 enter the engaging slits 51b of the guide slits 51. Then, the controller 30 stops the movement of the guide pins 60a and 60b in this state.

Through the operation described above, the power receiving connector 4 and the power supplying connector 22 are connected to each other with reliability. Then, after it is confirmed that a power receiving terminal 7 and a power supplying terminal 29 are connected to each other as in step S6 in FIG. 4, the controller 30 starts charging of the battery 2 of the robot 1'. At this time, even if an external force is exerted on the robot 1' for some reason, the connectors are not disconnected during charging because the guide pins 60 and the guide sleeves 50 are engaged with each other by the engaging pins 61 and the engaging slits 51b.

Now, an operation of separating the robot 1' from the charging station 20' of the charging system according to the second embodiment will be described. Also in this second embodiment, before disconnecting the power receiving connector 4 from the power supplying connector 22, the charging current supplied to the battery 2 from a charging power supply 26 is stopped (see S21 in FIG. 9). Then, the controller 30 makes the guide pin motor 62 rotate in the direction opposite to that for connecting the connectors, thereby moving the engaging pins 61 on the guide pins 60 from the engaging slits 51b to the longitudinal slits 51a of the guide slits 51 formed in the guide sleeves 50.

After the guide pins 60 are rotated and disengaged from the guide sleeves 50, the controller 30 controls the robot 1' to restore the position of the waist of the robot 1' before charging (see S25 in FIG. 9). In this step, the power receiving connector 4 and the power supplying connector 22 are disconnected from each other. The remaining steps of the control operation are the same as those shown in FIG. 9 excluding steps S23 and S24.

As described above, according to the second embodiment, the guide pins 60 and the guide sleeves 50 constitute the guide means and the locking mechanism, and the first rubber floating 66 and the second rubber floating 67 constitute the moving means. As a result, the whole of the charging system can be downsized. Specifically, because the guide pins 60 extending in the moving direction of the robot 1' are provided in place of the slide mechanism 23, the charging station 20' can be made compact in its widthdirection, which leads to improvement in the flexibility of layout in installing the charging station '20.

In addition, according to the second embodiment, the supporting plate 72 can be moved in the axial direction of the supporting rod 68 by the axial actuator 73 shown in FIG. 11. Therefore, for example, even if the robot 1' to be charged is erroneously positioned, and the position sensor 65 detects that the power receiving connector 4 and the power supplying connector 22 are spaced apart from each other, the positions of the connectors can be adjusted by the axial actuator 73. Furthermore, the axial actuator 73 enables the power supplying connector 22 and the guide pins 60 to be exposed to the outside of the charging station 20' when the robot 1' comes close to the charging station 20' for charging and to be housed in the charging station 20' when charging of the robot 1' is not performed. Furthermore, since the axial actuator 73 can move the power supplying connector 22 toward the power receiving connector 4, the robot 1' can be charged in the upright position, rather than leaning against the charging station 20'.

While the guide sleeves 50 are provided on the side of the power receiving connector 4, and the guide pins 60 are provided on the side of the power supplying connector 22 according to the second embodiment, the present invention is not limited thereto, and the guide pins 60 may be provided on the side of the power receiving connector 4, and the guide sleeves 50 may be provided on the side of the power supplying connector 22. In addition, while the locking mechanism is constituted by the engaging pins 61 on the guide pins 60 and the guide slits 51 formed in the guide sleeves 50 according to the second embodiment, a fitting latch 8 may be used as in the embodiment described above.

Furthermore, while the moving means is constituted by the first rubber floating 66 and the second rubber floating 67 according to the second embodiment, either one of the rubber floatings may be omitted if a single rubber floating suffices for movement of the power supplying connector 22 and the guide pins 60 in the radial direction of the guide pins 60.

What is claimed is:

1. A charging system for a legged mobile robot that charges a battery of the legged mobile robot, comprising:
a charging station on which said robot is charged,
wherein said robot includes a power receiving connector having a power receiving terminal, and
wherein said charging station includes a charging power supply that outputs a charging current to said battery, a power supplying connector designed to be connected to said power receiving connector, a power supplying terminal provided on said power supplying connector and designed to come into contact with said power receiving terminal, a guide means that guides said robot to reduce the misalignment between said power receiving connector and said power supplying connector in a predetermined direction when said robot comes close to said charging station for charging, and a moving means for moving said guide means in said predetermined direction by the force exerted on said guide means as said robot comes close to said charging station.

2. The charging system for a legged mobile robot according to claim 1, wherein said predetermined direction is a horizontal direction which is perpendicular to the direction in which said robot comes close to said charging station for charging.

3. The charging system for a legged mobile robot according to claim 2, wherein said moving means includes a slide rail that is provided on said charging station and extends horizontally and a slide block capable of horizontally moving along said slide rail, and said power supplying connector is fixed to said slide block.

4. The charging system for a legged mobile robot according to claim 3, wherein said power supplying connector is fixed to said slide block via a rubber bush.

5. The charging system for a legged mobile robot according to claim 1, further comprising a locking mechanism that locks said robot and said charging station to maintain the connection between said power receiving terminal and said power supplying terminal when said power receiving terminal and said power supplying terminal are connected to each other.

6. The charging system for a legged mobile robot according to claim 1, wherein:
said guide means includes a guide pin having a tapered tip and provided on one of said robot and said charging station, and a guide sleeve provided on the other of said robot and said charging station and having a widened opening to which said guide pin is to be inserted, and
said moving means is a floating member having resiliency that enables said guide pin or said guide sleeve to move in said predetermined direction.

7. The charging system for a legged mobile robot according to claim 6, wherein said guide means has a locking mechanism that prevents said guide pin from dropping from said guide sleeve, when said guide pin is inserted into said guide sleeve and said power receiving connector and said power supplying connector are connected to each other.

8. The charging system for a legged mobile robot according to claim 7, wherein:
said guide means has rotating means capable of rotating said guide pin,
said guide sleeve has a guide slit composed of a longitudinal slit extending in the axial direction toward the opening of said guide sleeve and an engaging slit extending in the circumferential direction of the guide sleeve from the root of said longitudinal slit,
said guide pin has an engaging protrusion that protrudes from the periphery thereof and is capable of being inserted into said guide slit, and
when said power receiving connector and said power supplying connector are connected to each other, said engaging protrusion is inserted into said longitudinal slit of said guide slit, and then inserted into said engaging slit of said guide slit by the action of said rotating means, and then held in that state.

9. The charging system for a legged mobile robot according to claim 1, wherein said power receiving connector is provided inside said robot and covered with a lid capable or being opened and closed, and said lid is closed when said power receiving connector and said power supplying connector are not connected to each other and opened when said power supplying connector comes close to the power receiving connector.

10. The charging system for a legged mobile robot according to claim 1, wherein said charging station includes:
a connection detection means for detecting whether said power receiving terminal and said power supplying terminal are connected to each other, and
a charging control means for making said charging power supply supply a charging current to said battery to charge said battery via said power supplying terminal and said power receiving terminal when said connection detection means detects that said power receiving terminal and said power supplying terminal are connected to each other.

11. The charging system for a legged mobile robot according to claim 10, wherein, when stopping charging of said battery, said charging control means stops the supply of the charging current from said charging power supply to said battery before disconnecting said power receiving terminal and said power supplying terminal.

* * * * *